United States Patent [19]

Heeb et al.

[11] Patent Number: 5,590,368
[45] Date of Patent: Dec. 31, 1996

[54] METHOD AND APPARATUS FOR DYNAMICALLY EXPANDING THE PIPELINE OF A MICROPROCESSOR

[75] Inventors: Jay Heeb, Gilbert, Ariz.; Sunil Shenoy; Jimmy Wong, both of Portland, Oreg.

[73] Assignee: Intel Corporation, Santa Clara, Calif.

[21] Appl. No.: 508,318

[22] Filed: Jul. 27, 1995

Related U.S. Application Data

[63] Continuation of Ser. No. 40,675, Mar. 31, 1993, abandoned.

[51] Int. Cl.⁶ .................................................. G06F 9/38
[52] U.S. Cl. ..................... 395/800; 395/467; 364/DIG. 1; 364/231.8; 364/240.5
[58] Field of Search ....................... 395/800, 775, 395/375, 445, 467, 287; 364/736

[56] References Cited

U.S. PATENT DOCUMENTS

| | | | |
|---|---|---|---|
| 3,346,851 | 6/1967 | Thornton et al. | 364/704 |
| 4,594,655 | 6/1986 | Hao et al. | 364/736 |
| 4,853,970 | 8/1989 | Ott et al. | 382/54 |
| 4,891,753 | 1/1990 | Budde et al. | 395/375 |
| 4,926,323 | 5/1990 | Baror et al. | 395/375 |
| 4,991,080 | 2/1991 | Emma et al. | 395/375 |
| 5,053,631 | 10/1991 | Perlman et al. | 364/736 |
| 5,155,816 | 10/1992 | Kohn | 395/375 |
| 5,157,774 | 10/1992 | Culley | 395/425 |
| 5,170,476 | 12/1992 | Laakso et al. | 395/425 |
| 5,222,240 | 6/1993 | Patol | 395/775 |
| 5,241,636 | 8/1993 | Kohn | 395/375 |
| 5,249,273 | 9/1993 | Yoshitake et al. | 395/375 |
| 5,416,911 | 5/1995 | Dinkjian et al. | 395/375 |
| 5,428,810 | 6/1995 | Barkow et al. | 395/800 |

*Primary Examiner*—Mehmet B. Geckil
*Attorney, Agent, or Firm*—Blakely, Sokoloff, Taylor & Zafman

[57] ABSTRACT

A dynamically expandable pipeline in a microprocessor. The present invention is used in a microprocessor or a microprocessor in a computer system. The present invention delays execution of a cacheable LOAD instruction by a bus controller for one cycle to allow sufficient time for "hit or miss" detection by a data cache unit. The present invention dynamically expands the instruction pipeline for cacheable LOAD instructions that "miss" an on-chip data cache when the LOAD is followed by another instruction that uses the bus controller. The dynamic pipeline allows time for the "hit or miss" detection by the data cache unit without unnecessarily degrading pipeline performance. The present invention offers increased overall microprocessor and computer system performance by allowing efficient implementation of an on-chip data cache. The present invention provides increased performance without undue or overly complex modifications to existing pipeline or data cache circuits.

9 Claims, 8 Drawing Sheets

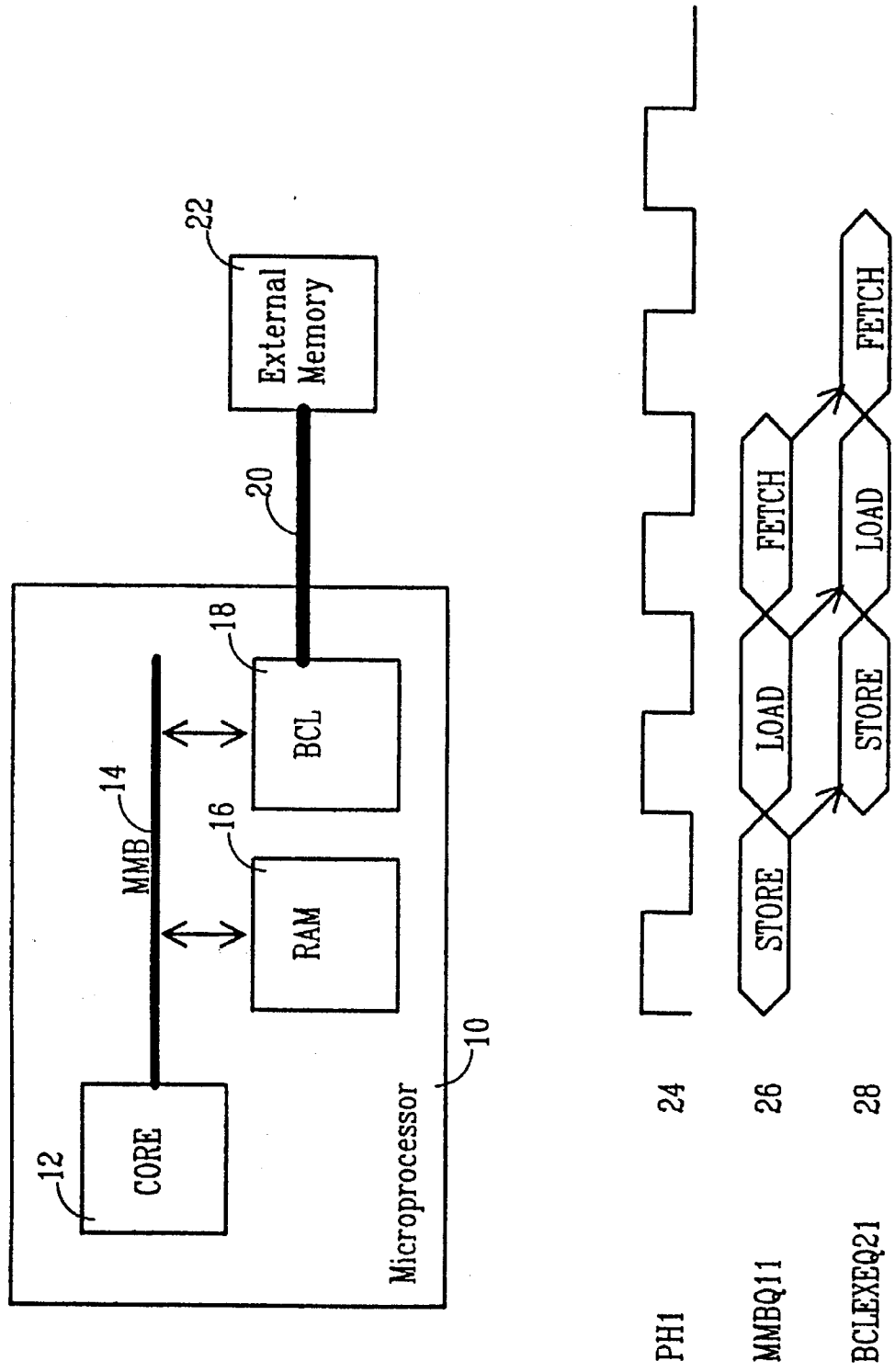

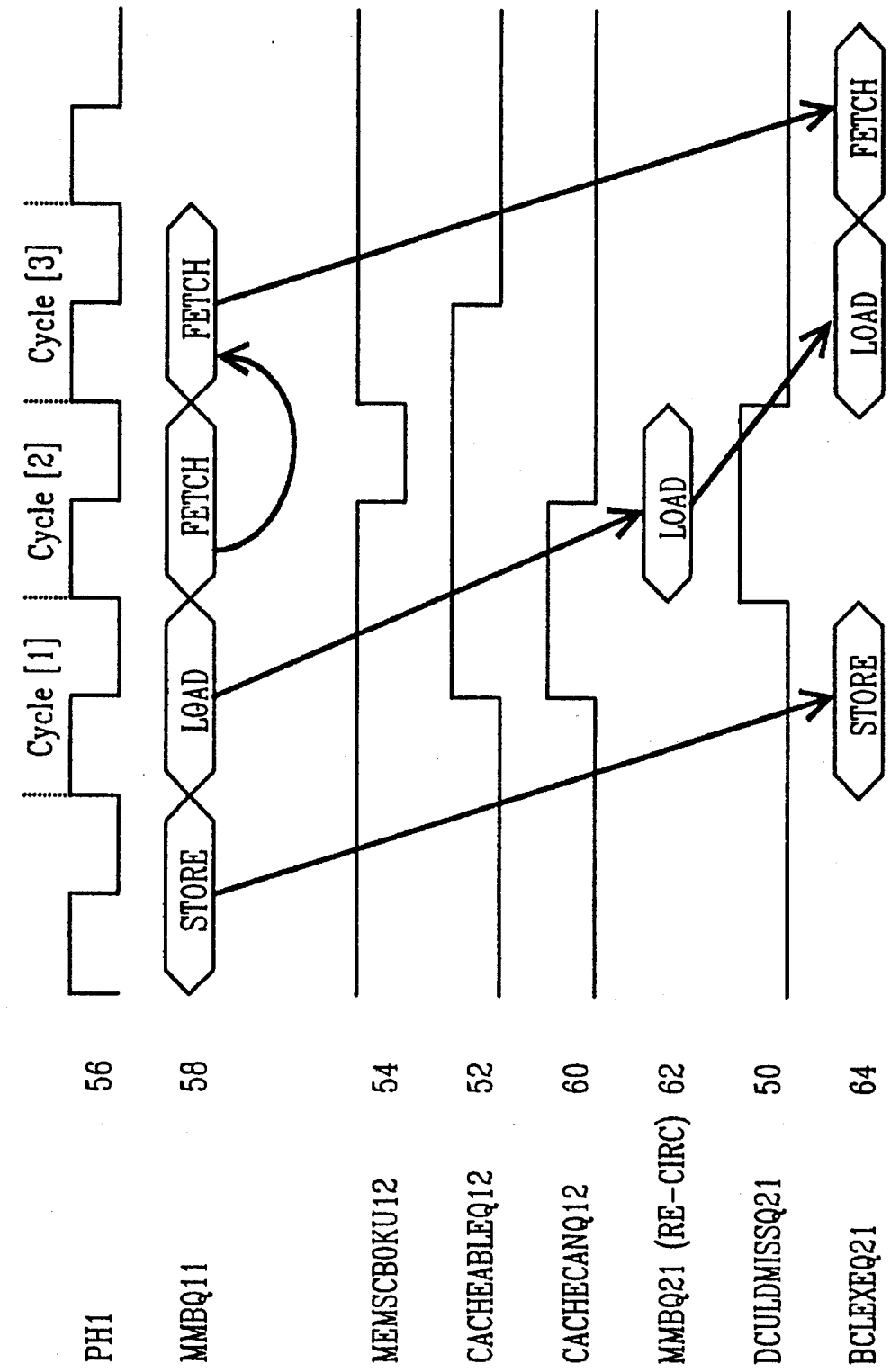

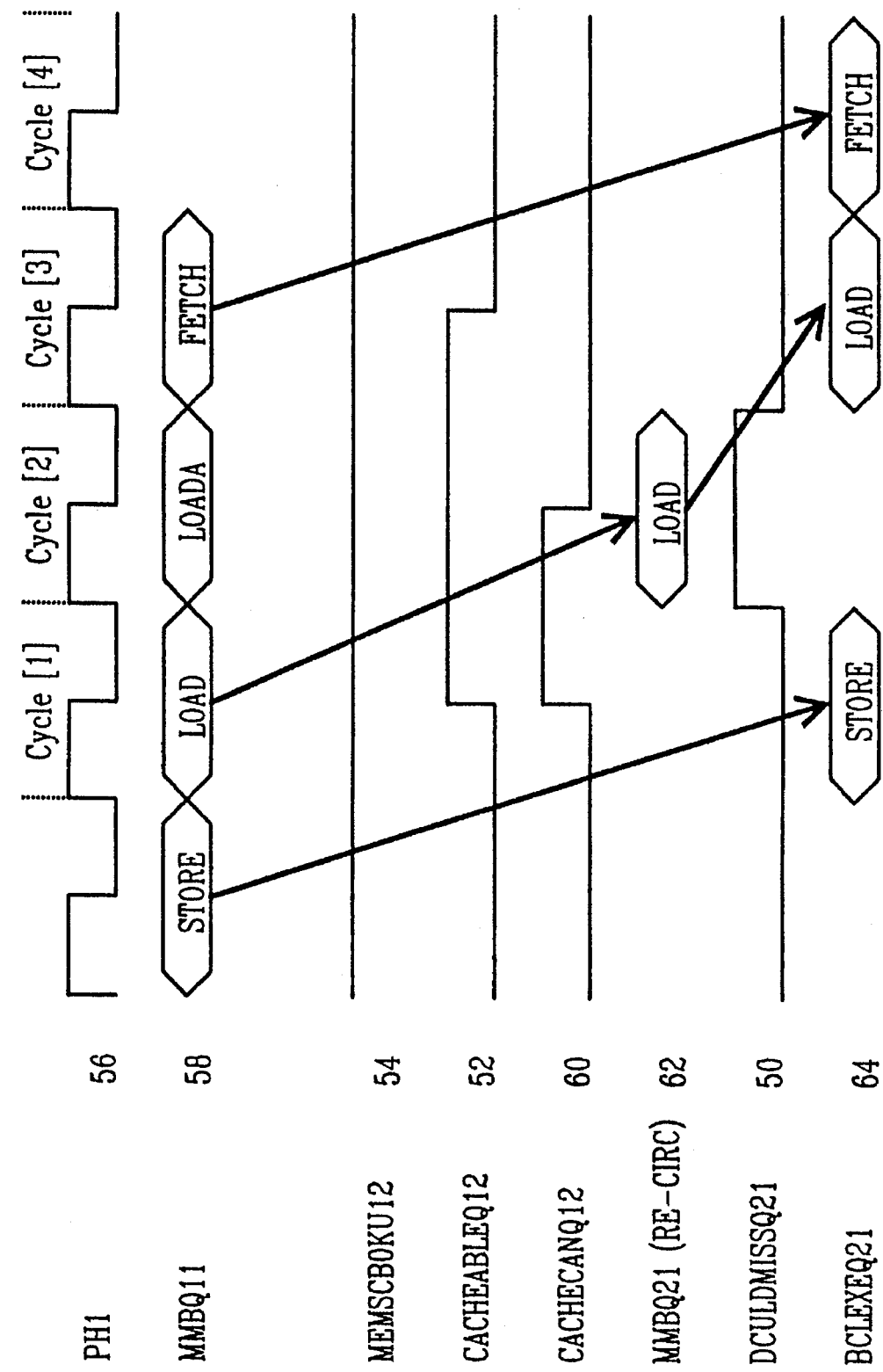
FIG.2C Cacheable LOAD "miss" w/o following BCL req'd

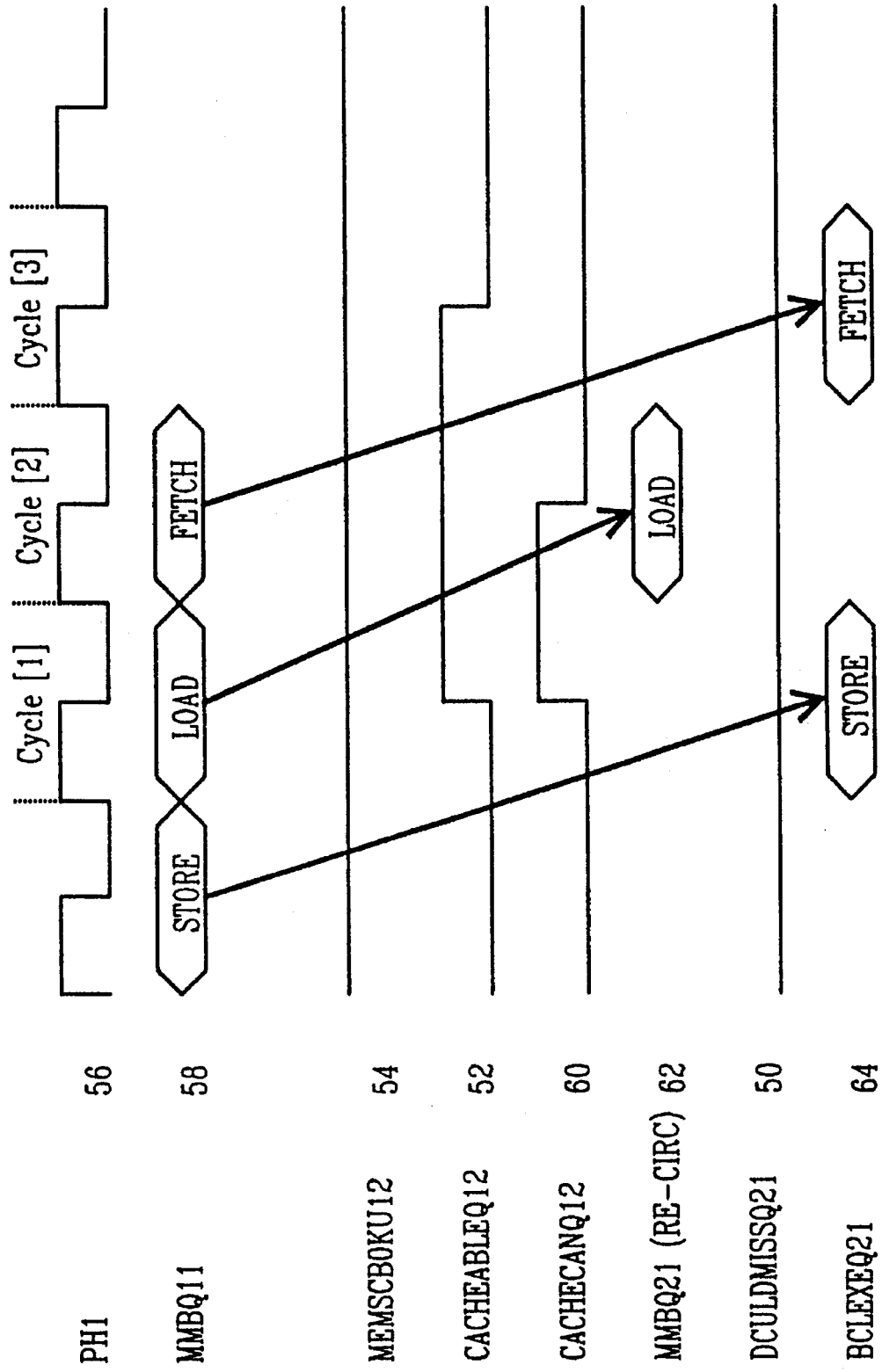

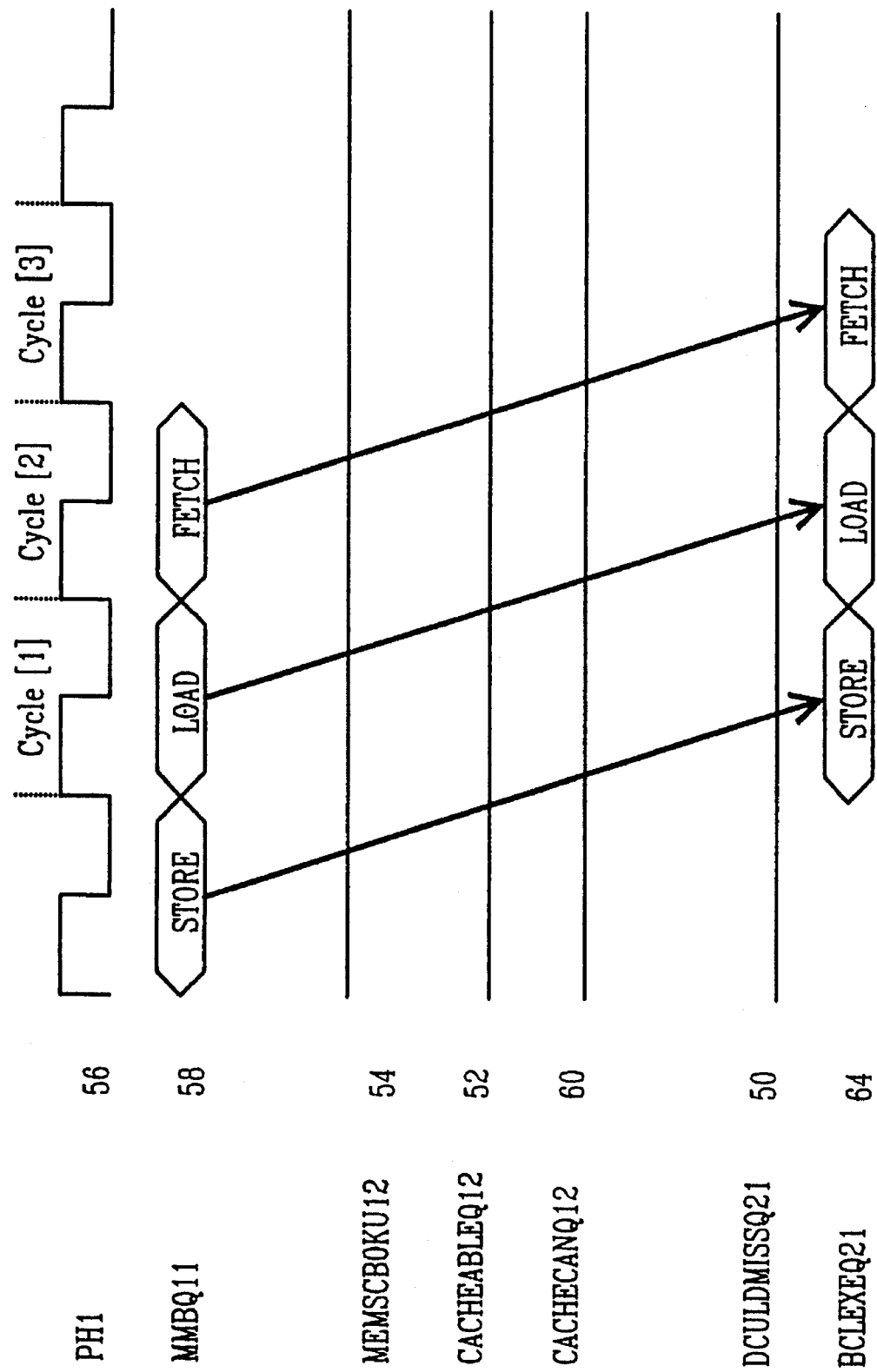
FIG.2E Non-Cacheable LOAD

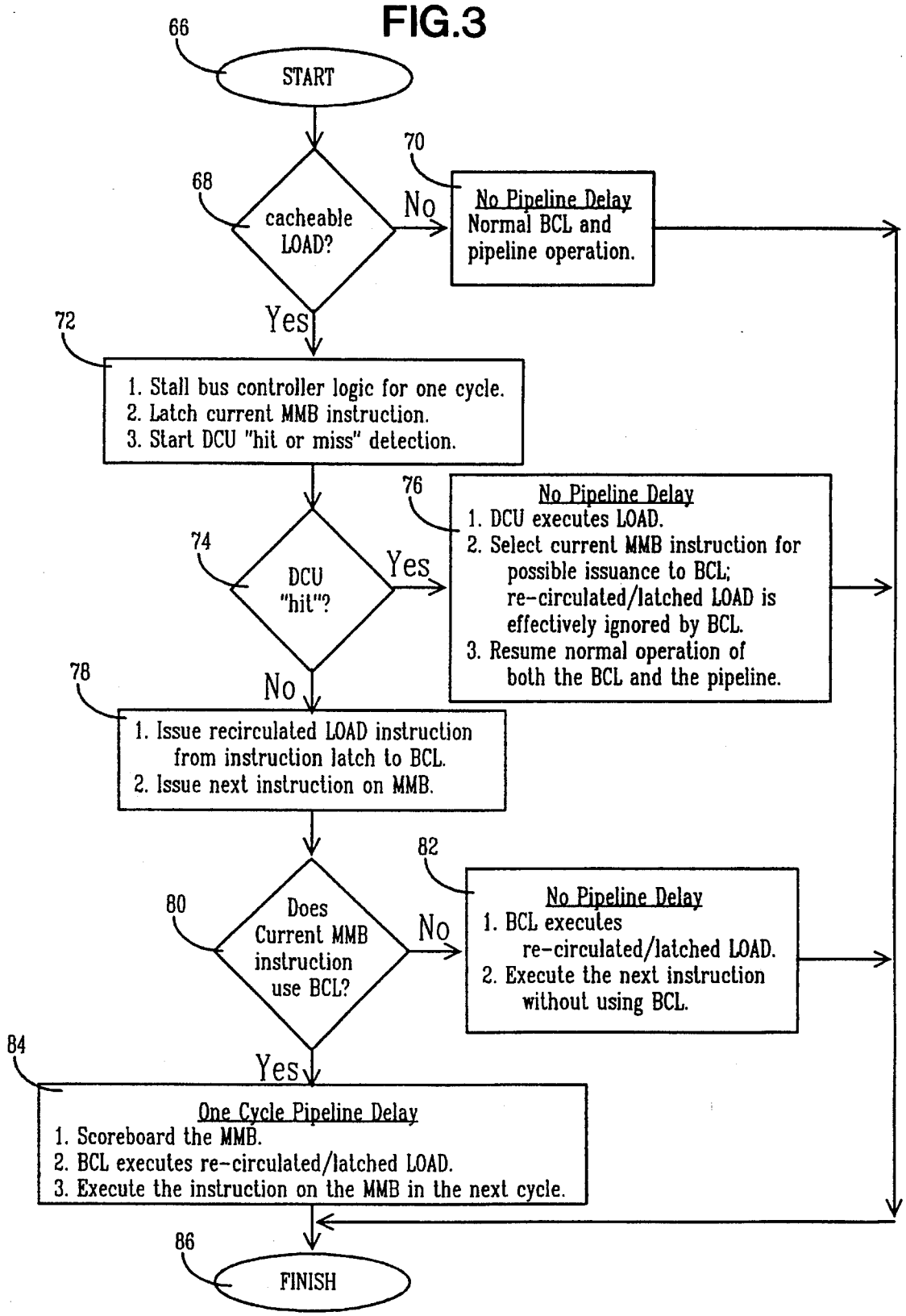

METHOD AND APPARATUS FOR DYNAMICALLY EXPANDING THE PIPELINE OF A MICROPROCESSOR

This is a continuation of application Ser. No. 08/040,675 filed Mar. 31, 1993, now abandoned.

BACKGROUND OF THE INVENTION

1. Field of the Invention

The present invention relates generally to the field of microprocessors and more specifically to pipelined microprocessors.

2. Prior Art

The design of an original microprocessor architecture requires a very large investment of time, money, and engineering effort. In order to maximize the profit realized over the lifetime of an architecture, proliferations of the original design are typically created to appeal to particular markets. A proliferation retains the "core" design of the original architecture, but enhances or adds to that design. For example, an original microprocessor design with a performance of 30 MIPs may be the perfect solution for the largest segment of the microprocessor market. However, other markets, such as laser printers, may demand a higher performance microprocessor. In this case, the original architecture could be enhanced to meet the performance requirements of the laser printer market by adding an on-chip data cache unit, speeding up the floating point unit, etc. The resulting proliferation may have a performance of 50 MIPs with slightly higher costs than the original. Proliferating an existing architecture is more attractive than creating a new design because the required investment is much smaller.

When an original architecture is defined, design choices and tradeoffs are necessarily made. In the design of a proliferation of the original architecture, problems imposed by the constraints of these original design choices are often encountered. Overcoming these constraints is often a challenging part of the design of a proliferation.

FIG. 1 illustrates a block diagram of a prior art microprocessor. Microprocessor 10 includes a processor core 12, a random access memory (RAM) 16, and a bus controller logic (BCL) 18, all coupled to a memory-side machine bus (MMB) 14. The processor core 12 generates an instruction pointer address, fetches the instruction at the instruction pointer address, decodes the instruction, and issues the decoded instruction to the functional units for execution. Bus controller logic 18 and an external memory 22 are coupled to a system bus 20. System bus 20 is used to transfer data between microprocessor 10 and external devices such as external memory 22. Bus controller logic 18 controls data transfers on system bus 20. When executing instructions, microprocessor 10 may operate on data retrieved either from random access memory 16 or external memory 22.

The memory-side machine bus 14 carries the control information and handles the local data transfers that occur during the fetching, issuing, and executing of memory instructions by the microprocessor pipeline. The fetching, issuing, and executing of instructions is pipelined in a "fixed" sequence of three stages or "pipes" as defined in Table I. Each stage is divided into two phases: phase 1 and phase 2.

TABLE I

Pipeline for Fetching, Issuing, and Executing Instructions

| Pipe 0: | Phase 1. | Generate Instruction Pointer (IP). |
| Pipe 0: | Phase 2. | Fetch instruction at IP address. |
| Pipe 1: | Phase 1. | Decode instruction. |
| Pipe 1: | Phase 2. | Issue instruction. |
| Pipe 2: | Phase 1. | Execute instruction. |
| Pipe 2: | Phase 2. | Return. |

During pipe 0, phase 1, the address of the next instruction is generated by processor core 12. This address is the instruction pointer (IP). During pipe 0, phase 2, the processor core 12 fetches the next instruction from the address indicated by the instruction pointer. The instruction is typically fetched from either external memory or an instruction cache. During pipe 1, phase 1, the instruction is decoded by the processor core 12. The processor core 12 determines, among other things, whether execution of the instruction uses machine-side memory bus 14. If the instruction uses the memory-side machine bus, then it is issued on memory-side machine bus 14 during pipe 1, phase 2. During issuance, the memory-side machine bus carries control information that indicates which of the possible units (RAM, BCL, or other) should execute the issued instruction. During pipe 2, phase 1, the appropriate coprocessor unit executes the issued instruction. For example, bus controller logic 18 executes a LOAD instruction by retrieving the required data from external memory 22. During pipe 2, phase 2, the return phase of the pipeline, data is returned to memory side machine bus 14 and transferred to the appropriate destination unit. Not all instructions return data during their pipe stage 2. Therefore, the return phase of the pipeline must be arbitrated to allow, for example, the bus controller to return data from external memory that was requested several instructions previously in the pipeline.

FIG. 1 shows an example of the operation of the pipeline of microprocessor 10 in waveforms PH1 24, MMBQ11 26, and BCLEXEQ21 28. (Note: Q11 means pipe 1, Phase 1; Q21 means pipe 2 phase 1.) PH1 24 indicates the phase of the pipeline. The pipeline is in phase 1 when PH1 24 is high and phase 2 when PH1 24 is low. MMBQ11 26 is the instruction decoding of pipe 1, phase 1. BCLEXEQ21 is the execution of pipe 2, phase 1. The waveforms of FIG. 1 illustrate a STORE, LOAD, FETCH sequence of instructions being decoded during pipe 1, phase 1 and executed during pipe 2, phase 1. A STORE instruction stores data to a memory. A LOAD instruction retrieves data from a memory. A FETCH is the loading of an instruction from external memory.

Microprocessor 10 has two possible "targets" that can execute or service an issued LOAD instruction: external memory 22 or internal RAM 16. Bus controller logic 18 is responsible for the detection and handling of this distinction. This detection is done in the same cycle in which the LOAD itself is issued, allowing bus controller logic 18 to begin executing a LOAD from external memory 22 in pipe 2, phase 1. In the case of a LOAD from RAM 16, the RAM will service the LOAD in pipe 2, phase 1.

During execution of a typical program, many of the data accesses by microprocessor 10 are data LOAD accesses from external memory 22. Microprocessor 10 may be forced to sit idle for some time waiting for a LOAD instruction to return data since accesses to external memory 22 are relatively slow. Therefore, one way to achieve a higher performance proliferation of the microprocessor 10 would be to include an on-chip data cache unit to circumvent the long access times needed to LOAD data from external memory 22. However, the fixed definition of the pipeline does not allow enough time for "hit or miss" detection by a data cache unit during a cacheable LOAD from external memory.

Addition of a data cache unit provides a third "target," the data cache unit, that can execute a LOAD instruction. During a LOAD, a tag match operation is performed by the data cache unit to determine whether the required data resides in the data cache unit. This detection begins in pipe 1, phase 2 at the same time the LOAD is issued. Unfortunately, the tag match operation, or "hit or miss" detection, of a data cache unit requires too much time to be completed before execution of the LOAD instruction begins in pipe 2, phase 1. Therefore, it is not possible to tell bus controller logic 18 whether or not to execute the LOAD in the execution cycle. An additional "dead" cycle is required to give the "hit or miss" detection enough time to properly determine whether the bus controller logic will need to service the LOAD. Creating a permanent "dead" cycle in the pipeline is one way to solve the problem. But a permanent "dead" cycle in the pipeline would seriously degrade the performance of the microprocessor.

Therefore, a method and apparatus for dynamically expanding the pipeline of a microprocessor is needed.

SUMMARY OF THE INVENTION

The present invention is drawn to an apparatus, system, and method for using a microprocessor having a dynamically expandable pipeline. The microprocessor of the present invention comprises a core means, a bus controller means, a pipeline means, and a staller means. The core means and bus controller means are coupled to a local bus. The bus controller means is coupled to a system bus for transferring data external to the microprocessor.

The core means fetches, decodes, and issues instructions on the local bus and processes data. The bus controller means loads instructions and data from an external store to said microprocessor via a system bus for processing by the core means. The pipeline means causes a first pipe to execute at least a first operation during a cycle and a second pipe to execute at least a second operation during the cycle. The pipeline means repeatedly executes the normal cycle. During a cycle, the first pipe produces a first result that is operated on by the second pipe in the next cycle. The second pipe selectively causes the bus controller means to perform the second operation of the second pipe.

The present invention further includes a staller means for selectively delaying the execution of the second operation of the cycle until the next normal cycle to allow a third pipeline operation to be completed before the beginning of the execution of the second operation.

One object of the present invention is to improve the overall performance of a microprocessor by providing a dynamically expandable pipeline. The dynamically expandable pipeline improves performance of the microprocessor by providing sufficient time in the pipeline to perform the "hit or miss" detection of an on-chip data cache means without unnecessarily degrading the pipeline performance.

Another object of the present invention is to improve the performance of a computer system by providing a computer system that uses a microprocessor with a dynamically expandable pipeline.

Yet another object of the present invention is to increase the performance of microprocessor and computer systems without undue or overly complex modifications to existing pipeline or data cache circuits.

BRIEF DESCRIPTION OF THE DRAWINGS

FIG. 1 is a block diagram of a prior art microprocessor having a fixed pipeline. Waveforms of a STORE, LOAD, FETCH sequence of the pipeline are shown.

FIG. 2B is an illustration of the dynamically expandable pipeline of the preferred embodiment of the present invention. The waveforms illustrate the case of a cacheable LOAD "miss" that is followed immediately by an instruction that requires execution by the bus controller logic.

FIG. 2C illustrates the preferred embodiment of the present invention for the case of a cacheable LOAD "miss" that is followed immediately by an instruction that does not require execution by the bus controller logic.

FIG. 2D illustrates the preferred embodiment of the present invention for the case of a cacheable LOAD "hit."

FIG. 2E illustrates the preferred embodiment of the present invention for the case of a non-cacheable LOAD.

FIG. 3 is a flowchart of the method of the preferred embodiment of the present invention.

DETAILED DESCRIPTION OF THE INVENTION

A method and apparatus for dynamically expanding the pipeline of a microprocessor is described. In the following description, numerous specific details are set forth, such as pipeline cycles, in order to provide a thorough understanding of the present invention. It will be apparent, however, to one skilled in the art that the present invention may be practiced without these specific details. In other instances, well-known methods and circuits are not described in detail in order not to obscure the present invention. It is understood that the present invention is comprised of transistor circuits that are readily manufacturable using well known CMOS (complementary metal-oxide semiconductor) technology.

The present invention addresses the problem of pipeline timing constraints encountered when attempting to utilize an on-chip data cache unit in a "fixed" pipeline microprocessor. More specifically, the present invention addresses the problem of not having enough time in a "fixed" pipeline to allow for data cache unit "hit or miss" detection to properly qualify an issued LOAD instruction such that the bus controller logic knows whether or not to execute the LOAD instruction in the following execution stage of the pipeline. The present invention can readily be used to improve the performance of new microprocessor architectures.

Overall Design of the preferred Embodiment of the Present Invention

Figure 2A:
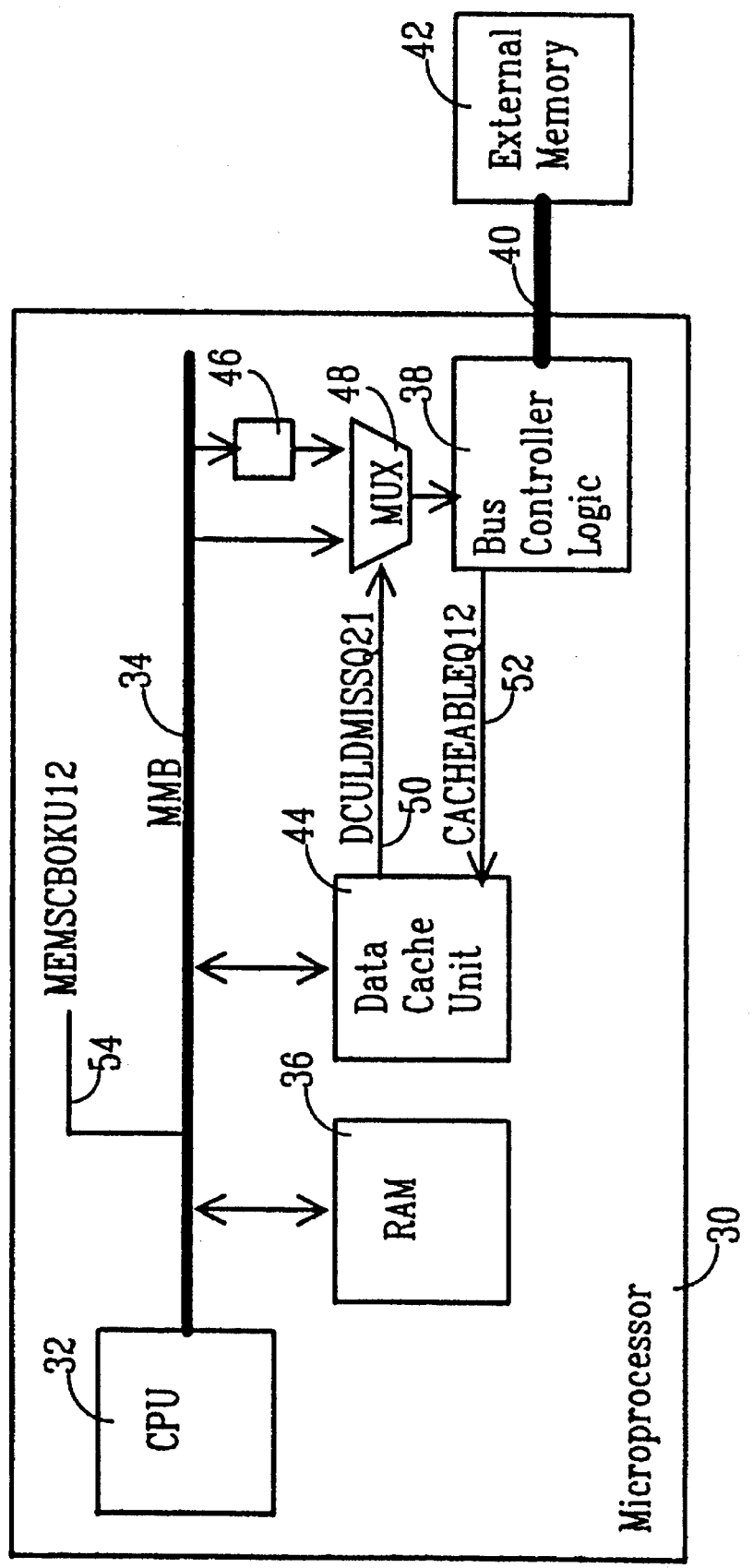
FIG. 2A is a block diagram of the preferred embodiment of the microprocessor of the present invention.

FIG. 2A is a block diagram of the preferred embodiment of the present invention. Microprocessor 30 includes a processor core 32, a random access memory (RAM) 36, a bus controller logic (BCL) 38, a data cache unit (DCU) 44, an instruction latch 46, a MUX 48, a memory-side machine bus (MMB) 34, and a system bus 40. Processor core 32, random access memory 36, and data cache unit 44 are coupled to memory-side machine bus 34. Memory-side machine bus 34 allows a common data transfer and control path between units that are connected to it. MEMSCBOKU12 54, a scoreboarding control signal carried by memory-side machine bus 34, can be asserted by any unit coupled to the memory-side machine bus. Asserting MEMSCBOKU12 54 causes each unit coupled to the memory-side machine bus to maintain the current pipeline state for an additional cycle to effect a one cycle delay in the pipeline. Processor core 32 generates an instruction pointer address and fetches the instruction at the instruction pointer address. It then decodes the instruction to determine which functional unit of microprocessor 30 should execute the instruction. Data cache unit 44 stores copies of data that bus controller logic 38 retrieves from external memory 42 for subsequent use by processor core 32. Data cache unit 44 receives a CACHEABLEQ12 52 signal from bus controller logic 38. CACHEABLEQ12 52 indicates whether a given access issued by processor core 32 is to a cacheable region of memory. CACHEABLEQ12 52 causes data cache unit 44 to handle only cacheable data. Random access memory 36 is a memory for storing data. Instruction latch 46 is coupled to memory-side machine bus 34 for storing an issued instruction to allow it to be effectively re-circulated one cycle later under certain conditions. MUX 48 is coupled to receive the instruction latched in instruction latch 46 and also to receive an issued instruction from memory-side machine bus 34. The select input of MUX 48 is coupled to a DCULDMISSQ21 signal 50 from data cache unit 44. When DCULDMISSQ21 50 is high, indicating a "miss," the re-circulated instruction in instruction latch 46 is driven at the mux output. When DCULDMISSQ21 50 is low, indicating that the previous instruction was not a cacheable LOAD which "missed" the data cache, the currently issued instruction on memory-side machine bus 34 is driven at the mux output. The output of MUX 48 is coupled to bus controller logic 38 allowing bus controller logic 38 to receive either the currently issued instruction from memory-side machine bus 34 or the re-circulated instruction stored in instruction latch 46. Bus controller logic 38 and an external memory 42 are coupled to a system bus 40. System bus 40 is used to transfer data between microprocessor 30 and external devices such as external memory 42.

FIG. 2B illustrates the waveforms of the dynamically expandable pipeline of microprocessor 30 for the case of a cacheable LOAD that "misses" data cache unit 44 followed by an instruction that requires execution by bus controller logic 38, i.e. a STORE, LOAD, or FETCH instruction.

In cycle [1], a cacheable LOAD instruction is issued on the memory-side machine bus 34 as shown by MMBQ11 58. In this same cycle, bus controller logic 38 drives CACHEABLEQ12 52 high indicating that the LOAD data is in a cacheable region of memory. Because the LOAD is cacheable, bus controller logic 38 also drives an internal signal, CACHECANQ12 60 high causing bus controller logic 38 to prevent both the execution of the instruction and the updating of the pipeline queue slots, thereby stalling the bus controller logic 38 for one cycle. The issued LOAD instruction is latched into instruction latch 46 for re-circulation in the next cycle, as shown on MMBQ21 62. Data cache unit 44 begins "hit or miss" detection in this cycle.

In cycle [2], the data cache unit finishes the "hit or miss" detection and drives DCULDMISSQ21 50 high to indicate a "miss." DCULDMISSQ21 50 drives the select input of MUX 48. DCULDMISSQ21 50 being high selects the instruction latched in instruction latch 46 as the instruction issued to bus controller logic 38. In this same cycle, data cache unit 44 "scoreboards" the memory-side machine bus 34 by driving MEMSCBOKU12 54 low if and only if the currently issued instruction on the bus will use the bus controller logic 38, i.e. a LOAD, STORE, or FETCH instruction. "Scoreboarding" causes each unit to maintain the current pipeline state for one additional cycle to effectively delay the pipeline for one cycle. In this example, a FETCH is the currently issued cycle [2] instruction on memory-side machine bus 34 and MEMSCBOKU12 54 going low causes the memory-side machine bus 34 to be scoreboarded, thereby delaying issuance of the FETCH until cycle [3]. Bus controller logic 38 must ignore the scoreboarded FETCH instruction since it has to first execute the re-circulated cacheable LOAD "miss" from instruction latch 46.

In cycle [3], the pipeline is restored to normal execution. The scoreboarded FETCH instruction is reissued on MMBQ11 58 and the re-circulated LOAD instruction is executed by bus controller logic 38 as shown on BCLEXEQ21 64.

The waveforms of FIG. 2B show that a cacheable LOAD instruction that "misses" the data cache unit causes a one cycle delay in the bus controller logic to allow sufficient time for "hit or miss" detection. When the following instruction also requires use of the bus controller logic, a resource collision is created. To resolve this conflict, the following instruction is scoreboarded to allow execution one cycle later, the LOAD instruction is executed during the current cycle, and the scoreboarded instruction is executed one cycle later than normal. Therefore, in the case of a cacheable LOAD that "misses" the data cache unit and is followed by an instruction that requires use of the bus controller logic, there is a one cycle penalty in pipeline performance.

However, in the case of a cacheable LOAD that "misses" the data cache unit and is followed by an instruction that does not use the bus controller logic, the delay in the bus controller does not result in a delay in the pipeline as now discussed with reference to FIG. 2C.

FIG. 2C illustrates the waveforms of the dynamically expandable pipeline of microprocessor 30 for the case of a cacheable LOAD that "misses" data cache unit 44 but is followed by an instruction that does not use bus controller logic 38.

Cycle [1] for this case is identical to the cacheable LOAD "miss" case of FIG. 2B. A cacheable LOAD instruction is issued on MMBQ11 58. In this same cycle, bus controller logic 38 drives CACHEABLEQ12 52 high indicating that the LOAD data is in a cacheable region of memory. Because the LOAD is cacheable, bus controller logic 38 also drives an internal signal, CACHECANQ12 60 high causing bus controller logic 38 to prevent both the execution of the instruction and the updating of the pipeline queue slots, thereby stalling the bus controller logic for one cycle. The issued LOAD instruction is latched into instruction latch 46 for re-circulation in the next cycle, as shown on MMBQ21 62. Data cache unit 44 begins "hit or miss" detection in this cycle.

Cycle [2] for this case is similar to the cacheable LOAD "miss" case of FIG. 2B, except that no scoreboarding of the memory-side machine bus is performed. The data cache unit finishes the "hit or miss" detection and drives DCULDMISSQ21 50 high to indicate a "miss." DCULDMISSQ21 50 being high selects the instruction latched in instruction latch 46 as the instruction issued to bus controller logic 38. MEMSCBOKU12 stays high preventing memory-side machine bus 34 from being scoreboarded. In this case, scoreboarding is not necessary because the currently issued LOADA instruction on the memory-side machine bus 34 bus does not use the bus controller logic 38. Therefore, there is no conflict with the bus controller logic 38 needing to simultaneously execute both the re-circulated instruction and the currently issued LOADA instruction on the memory-side machine bus 34.

In cycle [3], the bus controller is restored to normal execution; and the pipeline continues with normal execution. The LOAD instruction is re-circulated from instruction latch 46 and executed by bus controller logic 38 as shown on BCLEXEQ21 64. The LOADA instruction issued on memory-side machine bus 34 in cycle [2] is executed by another memory unit. And the FETCH instruction is issued on memory-side machine bus 34 (shown on MMBQ11 58) for subsequent execution by bus controller logic 38 in cycle [4].

Therefore, the waveforms of FIG. 2C show that a cacheable LOAD instruction that "misses" the data cache unit causes a one cycle delay in the bus controller logic. However, because the following instruction does not require use of the bus controller logic, the bus controller delay does not result in any delay in the pipeline.

FIG. 2D illustrates the waveforms of the dynamically expandable pipeline of microprocessor 30 for the case of a cacheable LOAD that "hits" data cache unit 44 followed by a FETCH instruction that requires execution by bus controller logic 38.

Again, cycle [1] is the same cycle [1] of FIG. 2B. A cacheable LOAD instruction is issued on MMBQ11 58. In this same cycle, bus controller logic 38 drives CACHEABLEQ12 52 high indicating that the LOAD data is in a cacheable region of memory. Because the LOAD is cacheable, bus controller logic 38 also drives an internal signal, CACHECANQ12 60 high causing bus controller logic 38 to prevent both the execution of the instruction and the updating of the pipeline queue slots, thereby stalling the bus controller logic 38 for one cycle. The issued LOAD instruction is latched into instruction latch 46 for re-circulation in the next cycle, but is not actually used in the next cycle. Data cache unit 44 begins "hit or miss" detection in this cycle.

In cycle [2], the data cache unit finishes the "hit or miss" detection and drives DCULDMISSQ21 50 low to indicate a "hit." DCULDMISSQ21 50 being low causes MUX 48 to select the currently issued FETCH instruction on memory-side machine bus 34 as the instruction issued to bus controller logic 38. In this case, the bus controller logic 38 does not need to execute the LOAD instruction because the required data can be returned from the data cache unit 44. Therefore, the delay in the bus controller logic results in no delay in the pipeline.

In cycle [3], the bus controller logic 38 and the pipeline continue normal execution. The FETCH instruction issued in cycle [2] is executed as shown on BCLEXEQ21 64.

Therefore, the waveforms of FIG. 2D show that a cacheable LOAD instruction that "hits" the data cache unit causes a one cycle delay in the bus controller logic, but no delay in the pipeline. Because of the "hit," the data cache unit executes the LOAD instruction leaving the bus controller logic free to execute the following FETCH instruction with no delay in the pipeline.

Finally, FIG. 2E illustrates the waveforms of the dynamically expandable pipeline of microprocessor 30 for the case of a non-cacheable LOAD. In the case of non-cacheable LOADs, the present invention maintains normal pipeline execution.

In cycle [1], a non-cacheable LOAD instruction is issued on MMBQ11 58 as shown by MMBQ11 58. In this same cycle, bus controller logic 38 drives CACHEABLEQ12 52 low indicating that the LOAD data is in a non-cacheable region of memory. Because the LOAD is non-cacheable, bus controller logic 38 drives internal signal CACHECANQ12 60 low causing bus controller logic 38 to execute the LOAD instruction and update the pipeline queue slots. The bus controller logic is not delayed one cycle for this case. The issued LOAD instruction is latched into instruction latch 46 for re-circulation, but the re-circulated instruction is not used in the next cycle. Data cache unit 44 does not perform "hit or miss" detection in this case.

In cycle [2], the data cache unit drives DCULDMISSQ21 50 low to indicate that the current memory request is not a cacheable LOAD, and therefore does not need to be re-circulated. DCULDMISSQ21 50 being low selects the issued LOAD instruction on memory-side machine bus 34 to be issued to bus controller logic 38. MEMSCBOKU12 54 stays high preventing memory-side machine bus 34 from being scoreboarded. The bus controller logic 38 executes the non-cacheable LOAD instruction as shown on BCLEXEQ21 64. Here there is no delay in the bus controller logic or the pipeline.

In cycle [3], the bus controller logic 38 and the pipeline continue normal execution. The FETCH instruction issued in cycle [2] on MMBQ11 58 is executed by the bus controller logic 38 on BCLEXEQ21 64.

Therefore, the waveforms of FIG. 2E show that a non-cacheable LOAD is executed normally with no delay in the bus controller logic or the pipeline.

Operation of the Preferred Embodiment of the Present Invention

The major functions of the preferred embodiment of the present invention operate according to the flow diagram illustrated in FIG. 3. In its overall operation, the present invention: 1) dynamically stalls the bus controller logic for any cacheable LOAD instruction, 2) dynamically expands the pipeline only when a cacheable LOAD "misses" the data cache unit and is immediately followed by another instruction that requires use of the bus controller logic, and 3) maintains the normal fixed sequence of the pipeline for all non-cacheable LOADs and other memory accesses.

Referring now to FIG. 3, the method of the present invention begins at step 66 when a LOAD instruction is issued on the memory-side machine bus 34. In step 68, the bus controller logic 38 determines whether the LOAD access is to a cacheable region of memory and drives signal CACHEABLEQ12 52 accordingly. If the LOAD is non-cacheable (CACHEABLEQ12 52 low), then in step 70 the bus controller logic: 38 and the pipeline operate in the normal fixed sequence of Table I. If the LOAD is cacheable (CACHEABLEQ12 52 high), then in step 72 three operations occur: 1) the bus controller is stalled for one cycle by preventing both the execution of the LOAD and the updating of the pipeline queue slots, 2) the currently issued cacheable LOAD instruction on the memory-side machine bus 34 is latched into instruction register 46 for subsequent re-circulation, if needed, and 3) the data cache unit 44 starts "hit or miss" detection (tag match operation).

In step 74, the data cache unit 44 determines whether the LOAD "hits" or "misses" the data cache unit 44 and drives DCULDMISSQ21 50 accordingly. If the LOAD "hits" (DCULDMISSQ21 50 low) the data cache unit 44, then in step 76 three operations occur: 1) the data cache unit 44 executes the LOAD by retrieving the matching data and returns the data to memory-side machine bus 34, 2) MUX 48 selects the memory-side machine bus 34 as the source of the next instruction issued to the bus controller logic 38 (the re-circulated/latched LOAD in instruction latch 46 is ignored by bus controller logic 38), and 3) normal operation of the bus controller logic 38 and the pipeline is resumed. If the LOAD "misses" (DCULDMISSQ21 50 high) the data cache unit 44, then in step 78 two operations occur: 1) MUX 48 selects the re-circulated LOAD instruction in instruction latch 46 to be issued to bus controller logic 38 and 2) the next instruction is issued on memory-side machine bus 34.

In step 80, bus controller logic 38 determines whether the currently issued instruction on the memory-side machine bus 34 uses the bus controller. If it does not, then in step 82 pipeline execution proceeds without any delay by: 1) the bus controller unit 38 executes the re-circulated/latched LOAD instruction and 2) the current instruction on the memory-side machine bus 34 is executed by some unit other than the bus controller logic 38. If the currently issued instruction on memory-side machine bus 34 uses the bus controller logic 38, then in step 84 the LOAD instruction and the following instruction are executed with a one cycle delay in the pipeline in the following three operations: 1) the memory-side machine bus is scoreboarded, 2) the bus controller logic 38 executes the re-circulated/latched LOAD instruction, and 3) the scoreboarded instruction is executed by the bus controller logic 38.

Steps 70, 76, and 82 all proceed to step 86 where the method finishes by resuming normal execution of the bus controller logic and the pipeline.

Overall System and Environment of the Present Invention

Figure 4:
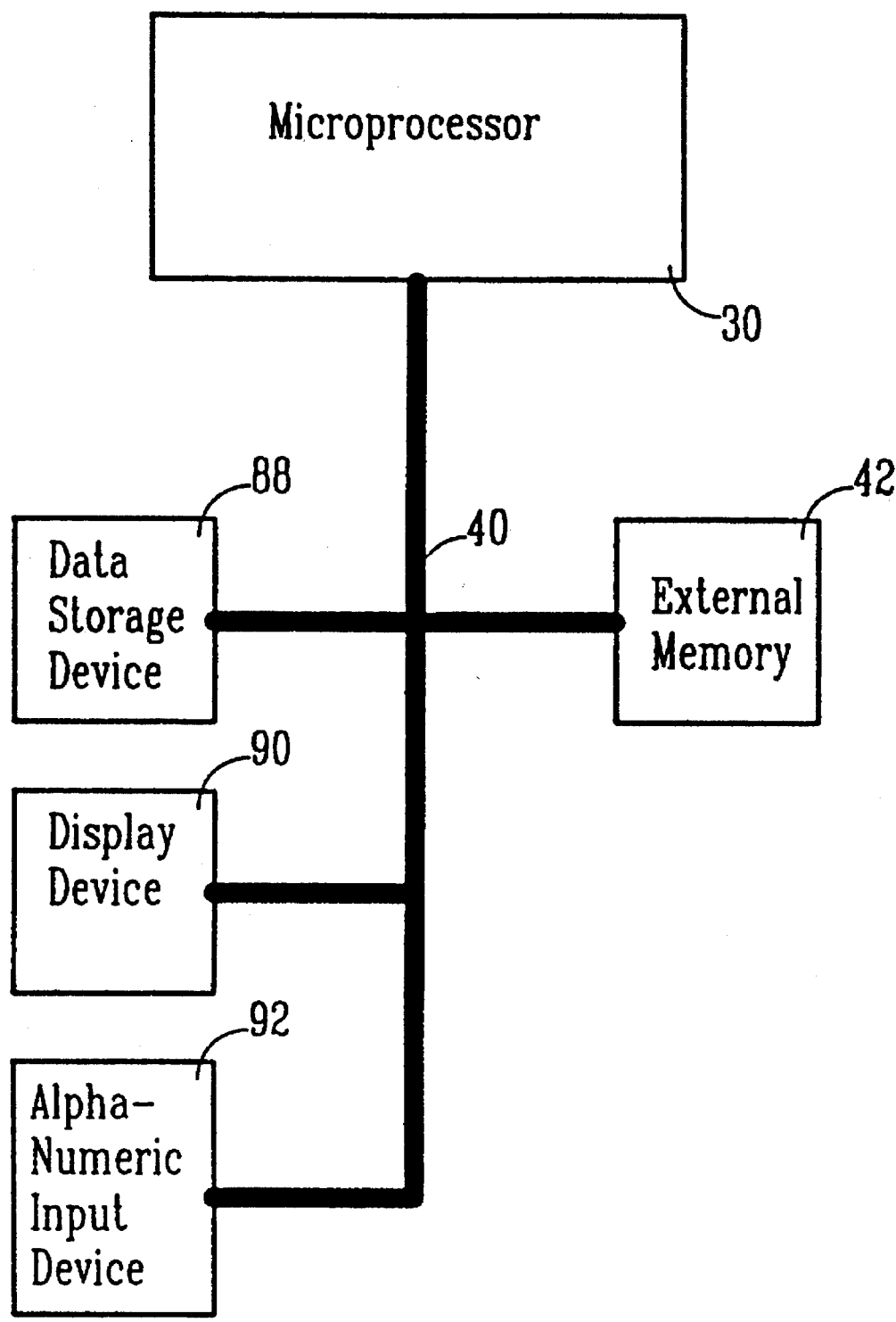
FIG. 4 is a block diagram of one overall system embodiment of the present invention.

The overall environment, or system, in which the preferred embodiment operates is now described. In general, the preferred the preferred embodiment of the present invention is used in digital computer systems comprising, as illustrated in FIG. 4, a system bus 40 for communicating information between the elements of the system, a microprocessor 30 coupled to system bus 40 for processing information and instructions, external memory 42 coupled to system bus 40 where the external memory can be either random access memory for storing information and instructions for the microprocessor or read only memory for storing static information and instructions for microprocessor 30, a data storage device 88 such as a magnetic disk and disk drive coupled with system bus 40 for storing program information and instructions, a display device 90 coupled to the system bus 40 for displaying information to the computer user, and an alphanumeric input device 92 coupled to the system bus 40 for communicating information and command selections to microprocessor 30. It is understood that some environments of the present invention may contain all or merely a portion of the above components.

Thus, a method and apparatus for dynamically expanding the pipeline of a microprocessor has been described.

What is claimed is:

1. A microprocessor, comprising:

core means for issuing instructions and for processing data, said core means being coupled to a local bus;

bus controller means for loading instructions and data from an external store to said microprocessor to be processed by said core means, said bus controller means being coupled to the local bus and to a system bus, the system bus for transferring data between said microprocessor and said external store; data cache means for storing copies of data loaded by said bus controller means and retrieving the copies of data for use by said core means, said data cache means being coupled to the local bus;

pipeline means, coupled to the local bus, for causing a first pipe to issue a first instruction on the local bus during a cycle and a second pipe to execute a second instruction during the cycle, said pipeline means repeatedly executing a cycle, the first instruction issued by the first pipe in the cycle being available for execution by the second pipe in the next cycle, the first pipe causing said core means to issue the first instruction, the second pipe selectively causing said bus controller means or said data cache means to execute the second instruction;

said data cache means having a determining means for determining if a copy of a first external data is stored in said data cache means when the first instruction issued by the core means during a first cycle is a load instruction to load the first data from external to said microprocessor, the determining beginning during the first cycle but not finishing before the first cycle ends, the first cycle being immediately followed by a second cycle, the second cycle being immediately followed by a third cycle;

staller means, coupled to the local bus, for delaying execution of the second instruction by the second pipe in the second cycle until the third cycle when the first instruction issued by the first pipe during the first cycle is the load instruction, the delay in executing the second instruction allowing the determining means to determine whether said data cache means stores the copy of the first external data before execution of the second instruction begins; expander means, coupled to the local bus, for delaying issuance of the first instruction in the second cycle until the third cycle when the delay by said staller means would otherwise create a resource collision in the second pipe during the third cycle: and a selection means for selecting between reissuing the first instruction and issuing a current instruction during the second cycle.

2. A microprocessor, comprising:

core means for issuing instructions and processing data, said core means being coupled to a local bus;

bus controller means for loading instructions and data from an external store to said microprocessor to be processed by said core means, said bus controller means being coupled to the local bus and to a system bus, the system bus for transferring data between said microprocessor and the external store;

data cache means for storing copies of data loaded by said bus controller means and retrieving the copies of data for use by said core means, said data cache means being coupled to the local bus;

pipeline means, coupled to the local bus, for causing a first pipe to issue a first instruction on the local bus during a cycle and a second pipe to execute a second instruction during the cycle, said pipeline means repeatedly executing the cycle, the first instruction issued by the first pipe in the cycle being available for execution by the second pipe in the next cycle, the first pipe causing said core means to issue the first instruction, the second pipe selectively causing said bus controller means or said data cache means to execute the second instruction;

said data cache means having a determining means for determining if a copy of a first external data is stored in said data cache means when the first instruction issued by the core means during the first cycle is a load instruction to load the first data from external to said microprocessor, the determining beginning during the first cycle but not finishing before the first cycle ends, the first cycle being immediately followed by a second cycle, the second cycle being immediately followed by a third cycle; said bus controller means having a cache ability means for indicating whether the first external data is cacheable, the cache ability means being coupled to said data cache means, the determining means performing the determining only if the first external data is cacheable;

said bus controller means having a staller means for delaying execution of the second instruction by the second pipe in the second cycle until the third cycle when the cache ability means indicates that the first external data is cacheable;

scoreboarding means for scoreboarding the first pipe when the copy of the first external data is not stored in said data cache means and the first instruction issued by the first pipe in the second normal cycle is an instruction that requires execution by said bus controller means, said scoreboarding maintaining the state of the first pipe for one additional cycle such that the first instruction issued by the first pipe in the second cycle is reissued by the first pipe in the third cycle, said scoreboarding means being coupled to the local bus;

instruction latching means for latching a copy of the first instruction issued by the first pipe during the cycle, said instruction latching means being coupled to the local bus; and mux means for selecting either a currently issued instruction on the local bus or the latched copy of the first instruction to be issued to said bus controller means, said mux means selecting the currently issued instruction when the determining means indicates that a copy of the first external data is stored in said data cache means, said mux means selecting the latched copy of the first instruction when the determining means indicates that a copy of the first external data is not stored in said data cache means, said mux means having a first input coupled to the local bus, a second input coupled to the instruction latch, a select input coupled to said data cache means, and a mux output coupled to said bus controller means.

3. A microprocessor, comprising:

a core unit for issuing instructions and processing data, said core unit being coupled to a local bus;

a bus controller logic for loading instructions and data from an external store to said microprocessor to be processed by said core unit, said bus controller logic being coupled to the local bus and to a system bus, the system bus for transferring data between said microprocessor and the external store;

a data cache unit for storing copies of data loaded by said bus controller logic and retrieving the copies of data for use by said core unit, said data cache unit being coupled to the local bus;

a pipeline, coupled to the local bus, for causing a first pipe to at least issue a first instruction on the local bus during a cycle and a second pipe to at least execute a second instruction during the cycle, said pipeline repeatedly executing the cycle, the first instruction issued by the first pipe in the cycle being available for execution by the second pipe in a next cycle, the first pipe causing said core unit to issue the first instruction, the second pipe selectively causing said bus controller logic or said data cache unit to execute the second instruction;

said data cache unit determining if a copy of a first external data is stored in said data cache unit when the first instruction issued by the core unit during the cycle is a load instruction to load the first external data from external to said microprocessor, the determining beginning during the cycle but not finishing before the cycle ends, the cycle being immediately followed by a second cycle, the second cycle being immediately followed by a third cycle;

said bus controller logic indicating to said data cache unit whether the first external data is cacheable, said bus controller logic being coupled to said data cache unit, said data cache unit determining if a copy of the first external data is stored only if the first external data is cacheable;

said bus controller logic delaying execution of the second instruction in the second cycle until the third cycle when the first external data is cacheable;

a scoreboarding unit for scoreboarding the first pipe when the copy of the first external data is not stored in said data cache unit and the first instruction issued by the first pipe in the second cycle is an instruction that requires execution by said bus controller logic, said scoreboarding maintaining the state of the first pipe for one additional cycle such that the first instruction issued by the first pipe in the second cycle is reissued by the first pipe in the third cycle, said scoreboarding unit being coupled to the local bus;

an instruction latch coupled to the local bus, said instruction latch latching a copy of the first instruction issued by the first pipe during the cycle; and a mux having a first input coupled to the local bus, a second input coupled to the instruction latch, a select input coupled to said data cache unit, and a mux output coupled to said bus controller logic, said mux selecting either the first input or the second input to be driven at the mux output, said mux selecting the first input when the cow of the first external data is stored in said data cache unit, said mux selecting the second input when the copy of the first external data is not stored in said data cache unit.

4. A computer system comprising:

a) system bus means for providing a common communication pathway; memory storage means coupled to said system bus for storing a plurality of original data, said memory storage means storing the plurality of original data in a plurality of memory locations; and b) microprocessor means coupled to said system bus for executing a plurality of instructions, said microprocessor including core means for issuing instructions and processing data, said core means being coupled to a local bus;

bus controller means for loading instructions and data from said memory storage means to be processed by said core means, said bus controller means being coupled to the local bus and to a system bus, the system bus for transferring data between said microprocessor and said memory storage means;

data cache means for storing copies of data loaded by said bus controller means and retrieving the copies of data for use by said core means, said data cache means being coupled to the local bus;

pipeline means, coupled to the local bus, for causing a first pipe to at least issue a first instruction on the local bus during a cycle and a second pipe to at least execute a second instruction during the cycle, said pipeline means repeatedly executing the cycle, the first instruction issued by the first pipe in the cycle being available for execution by the second pipe in a next cycle, the first pipe causing said core means to issue the first instruction, the second pipe selectively causing said bus controller means or said data cache means to execute the second instruction;

said data cache means having a determining means for determining if a copy of a first external data is stored in said data cache means when the first instruction issued by the core means during a first cycle is a load instruction to load the first data from the memory storage means, the determining beginning during the first cycle but not finishing before the first cycle ends, the first cycle being immediately followed by a second cycle, the second cycle being immediately followed by a third cycle; and staller means, coupled to the local bus, for delaying execution of the second instruction by the second pipe in the second cycle until the third cycle when the first instruction issued by the first pipe during the first cycle is the load instruction, the delay in executing the second instruction allowing the determining means to determine whether said data cache means stores the copy of the first external data before execution of the second instruction begins;

expander means, coupled to the local bus, for delaying issuance of the first instruction in the second cycle until the third cycle when the delay by said staller means would otherwise create a resource collision in the second pipe during the third cycle: and selection means, coupled to the local bus, for selecting between reissuing the first instruction and issuing a current instruction in the second cycle.

5. A computer system comprising:

a) system bus means for providing a common communication pathway; memory storage means coupled to said system bus for storing a plurality of original data, said memory storage means storing the plurality of original data in a plurality of memory locations; and b) microprocessor means coupled to said system bus for executing a plurality of instructions, said microprocessor including:

core means for issuing instructions and for processing data, said core means being coupled to a local bus;

bus controller means for loading instructions and data from said memory storage means to be processed by said core means, said bus controller means being coupled to the local bus and to a system bus, the system bus for transferring data between said microprocessor and said memory storage means; data cache means for storing copies of data loaded by said bus controller means and retrieving the copies of data for use by said core means, said data cache means being coupled to the local bus;

pipeline means, coupled to the local bus, for causing a first pipe to issue a first instruction on the local bus during a cycle and a second pipe to execute a second instruction during the cycle, said pipeline means repeatedly executing the cycle, the first instruction issued by the first pipe in the cycle being available for execution by the second pipe in a next cycle, the first pipe causing said core means to issue the first instruction, the second pipe selectively causing said bus controller means or said data cache means to execute the second instruction;

said data cache means having a determining means for determining if a copy of a first external data is stored in said data cache means when the first instruction issued by the core means during the first cycle is a load instruction to load the first data from said memory storage means, the determining beginning during the first cycle but not finishing before the first cycle ends, the first cycle being immediately followed by a second cycle, the second cycle being immediately followed by a third cycle;

said bus controller means having a cache ability means for indicating whether the first external data is cacheable, the cache ability means being coupled to said data cache means, the determining means performing the determining only if the first external data is cacheable;

said bus controller means having a staller means for delaying execution of the second instruction by the second pipe in the second cycle until the third cycle when the cache ability means indicates that the first external data is cacheable;

scoreboarding means for scoreboarding the first pipe when the copy of the first external data is not stored in said data cache means and the first instruction issued by the first pipe in the second cycle is an instruction that requires execution by said bus controller means, said scoreboarding maintaining the state of the first pipe for one additional cycle such that the first instruction issued by the first pipe in the second cycle is reissued by the first pipe in the third cycle, said scoreboarding means being coupled to the local bus;

instruction latching means for latching a copy of the first instruction issued by the first pipe during the cycle, said instruction latching means being coupled to the local bus: and mux means for selecting either a currently issued instruction on the local bus or the latched copy of the first instruction to be issued to said bus controller means, said mux means selecting the currently issued instruction when the determining means indicates that a copy of the first external data is stored in said data cache means, said mux means selecting the latched copy of the first instruction when the determining means indicates that a copy of the first external data is not stored in said data cache means, said mux means having a first input coupled to the local bus, a second input coupled to the instruction latch, a select input coupled to said data cache means, and a mux output coupled to said bus controller means.

6. A computer system comprising:

a) a system bus for providing a common communication pathway; a memory storage device coupled to said system bus for storing a plurality of original data, said memory storage device storing the plurality of original data in a plurality of memory locations; and b) a microprocessor coupled to said system bus for executing a plurality of instructions, said microprocessor including:

a core unit for issuing instructions and processing data, said core unit being coupled to a local bus;

a bus controller logic for loading instructions and data from the memory storage device to be processed by said core unit, said bus controller logic being coupled to the local bus and to a system bus, the system bus for transferring data between said microprocessor and said memory storage device;

a data cache unit for storing copies of data loaded by said bus controller logic and retrieving the copies of data for use by said core unit, said data cache unit being coupled to the local bus;

a pipeline, coupled to the local bus, for causing a first pipe to issue a first instruction on the local bus during a cycle and a second pipe to execute a second instruction during the cycle, said pipeline repeatedly executing the cycle, the first instruction issued by the first pipe in the cycle being available for execution by the second pipe in a next cycle, the first pipe causing said core unit to issue the first instruction, the second pipe selectively causing said bus controller logic or said data cache unit to execute the second instruction;

said data cache unit determining if a copy of a first external data is stored in said data cache unit when the first instruction issued by the core unit during the first cycle is a load instruction to load the first data from the memory storage device, the determining beginning during the first cycle but not finishing before the first cycle ends, the first cycle being immediately followed by a second cycle, the second cycle being immediately followed by a third cycle;

said bus controller logic indicating to said data cache unit whether the first external data is cacheable, said bus controller logic being coupled to said data cache unit, said data cache unit determining if a copy of the first external data is stored only if the first external data is cacheable;

said bus controller logic delaying execution of the second instruction in the second cycle until the third cycle when the first external data is cacheable;

a scoreboarding unit for scoreboarding the first pipe when the copy of the first external data is not stored in said data cache unit and the first instruction issued by the first pipe in the second cycle is an instruction that requires execution by said bus controller logic, said scoreboarding maintaining the state of the first pipe for one additional cycle such that the first instruction issued by the first pipe in the second cycle is reissued by the first pipe in the third cycle, said scoreboarding unit being coupled to the local bus;

an instruction latch coupled to the local bus, said instruction latch latching a copy of the first instruction issued by the first pipe during the cycle; and a mux having a first input coupled to the local bus, a second input coupled to the instruction latch, a select input coupled to said data cache unit, and a mux output coupled to said bus controller logic, said mux selecting either the first input or the second input to be driven at the mux output, said mux selecting the first input when the copy of the first external data is stored in said data cache unit, said mux selecting the second input when the copy of the first external data is not stored in said data cache unit.

7. A method for dynamically expanding a pipeline of a microprocessor having a core unit, a bus controller logic, and a data cache unit, comprising the steps of:

delaying the pipeline for at least one cycle when a cacheable LOAD misses the data cache unit and a next instruction in the pipeline uses the bus controller logic:

first stalling the bus controller logic for at least one cycle without delaying the pipeline when a cacheable LOAD hits the data cache unit;

second stalling the bus controller logic for at least one cycle without delaying the pipeline when a cacheable LOAD misses the data cache unit and the next pipeline instruction does not use the bus controller logic: and operating the pipeline without any delays when the pipeline issues and executes anon, cacheable LOAD instruction.

8. A method for dynamically expanding a pipeline of a microprocessor having a core unit, a bus controller logic, and a data cache unit, comprising the steps of:

a) first determining whether a LOAD instruction issued on the pipeline is cacheable, the LOAD instruction being an instruction to load a first external data from external to the microprocessor;

b) maintaining normal pipeline execution with no delay in the pipeline when the LOAD instruction is non-cacheable;

c) when the LOAD is cacheable:
   1) stalling the bus controller logic for at least one cycle; and
   2) latching the LOAD instruction in an instruction latch;

d) second determining whether a copy of the first external data is stored in the data cache unit;

e) first executing of the cacheable LOAD instruction by the data cache unit when the first external data is stored in the data cache unit, the first executing causing no delay in the pipeline: and f) when the first external data is not stored in the data cache unit:
   1) re-circulating the latched LOAD instruction to the bus controller logic;
   2) issuing a next instruction on the pipeline.

9. The method of claim 8, further comprising the steps of:

g) third determining whether the issued next instruction uses the bus controller logic;

h) second executing of the latched LOAD instruction by the bus controller logic without any resulting delay in the pipeline when the issued next instruction does not use the bus controller logic; and i) when the following instruction uses the bus controller logic:
   1) scoreboarding the next instruction to cause a one cycle delay in the pipeline in issuing and executing the next instruction;
   2) third executing of the latched LOAD instruction by the bus controller logic; and
   3) fourth executing of the scoreboarded next instruction by the bus controller logic after the one cycle delay in the pipeline.

* * * * *